(12) United States Patent
Torii

(10) Patent No.: US 10,127,239 B2
(45) Date of Patent: Nov. 13, 2018

(54) COMPUTER READABLE RECORDING MEDIUM STORING DATA MANAGEMENT PROGRAM, DATA MANAGEMENT APPARATUS, AND DATA MANAGEMENT SYSTEM

(71) Applicant: KONICA MINOLTA, INC., Tokyo (JP)

(72) Inventor: Yuko Torii, Itami (JP)

(73) Assignee: KONICA MINOLTA, INC., Tokyo (JP)

(*) Notice: Subject to any disclaimer, the term of this patent is extended or adjusted under 35 U.S.C. 154(b) by 586 days.

(21) Appl. No.: 13/866,974

(22) Filed: Apr. 19, 2013

(65) Prior Publication Data
US 2013/0304760 A1 Nov. 14, 2013

(30) Foreign Application Priority Data
May 9, 2012 (JP) ................................ 2012-107824

(51) Int. Cl.
G06F 17/30 (2006.01)
G06F 3/0481 (2013.01)
G06F 21/62 (2013.01)

(52) U.S. Cl.
CPC .... *G06F 17/30115* (2013.01); *G06F 3/04817* (2013.01); *G06F 21/6218* (2013.01)

(58) Field of Classification Search
None
See application file for complete search history.

(56) References Cited

U.S. PATENT DOCUMENTS

| | | | | |
|---|---|---|---|---|
| 8,332,951 | B2* | 12/2012 | Chakra | G06F 21/6218 709/226 |
| 2003/0100999 | A1* | 5/2003 | Markowitz | G06F 19/28 702/20 |
| 2003/0200234 | A1* | 10/2003 | Koppich | G06F 17/30011 |
| 2007/0150475 | A1 | 6/2007 | Hamada | |

(Continued)

FOREIGN PATENT DOCUMENTS

| | | |
|---|---|---|
| JP | 2007-172398 | 7/2007 |
| JP | 2007-213587 | 8/2007 |

(Continued)

OTHER PUBLICATIONS

Notification of Reason for Refusal issued by JPO for Appl. No. 2012-107824 dispatched Jan. 20, 2015, 3 pgs.

(Continued)

*Primary Examiner* — Charles D Adams
(74) *Attorney, Agent, or Firm* — Squire Patton Boggs (US) LLP

(57) ABSTRACT

Regarding a management of data stored in a folder to which a permission range of access is set, a data management apparatus is caused to perform (a) a detection region setting step which sets a detection region for detecting a preliminary operation, which is for storing any data into a destination folder which can store data; and (b) a storing limitation step which limits the storing of the data into the destination folder in cases where the preliminary operation is detected at the set detection region, and the access permission range set for the destination folder is different from the access permission range set for a source folder storing the data originally.

12 Claims, 12 Drawing Sheets

(56) References Cited

U.S. PATENT DOCUMENTS

| | | | |
|---|---|---|---|
| 2007/0198561 A1 | 8/2007 | Lee et al. | |
| 2010/0295778 A1 | 11/2010 | Abe et al. | |
| 2010/0306702 A1* | 12/2010 | Warner | G06F 3/0482 |
| | | | 715/811 |
| 2011/0252375 A1* | 10/2011 | Chaudhri | G06F 3/04817 |
| | | | 715/835 |

FOREIGN PATENT DOCUMENTS

| | | |
|---|---|---|
| JP | 2007-293619 | 8/2007 |
| JP | 2011-511332 | 4/2011 |

OTHER PUBLICATIONS

Translation of the Notification of Reason for Refusal issued by JPO for Appl. No. 2012-107824 dispatched Jan. 20, 2015, 3 pgs.
Notification of Reason for Refusal issued by JPO for Appl. No. 2012-107824 dispatched Sep. 16, 2014, 2 pgs.
Translation of the Notification of Reason for Refusal issued by JPO for Appl. No. 2012-107824 dispatched Sep. 16, 2014, 3 pgs.

\* cited by examiner

FIG.6

Opening range data 300

| Setting name | Network on which data is opened | Access authority | Width of opening range |
|---|---|---|---|
| First opening range | Internet | Public | 1 |
| Second opening range | Internet | Share | 2 |
| Third opening range | Internet | Private | 4 |
| Fourth opening range | Intranet | Public | 2 |
| Fifth opening range | Intranet | Share | 3 |
| Sixth opening range | Intranet | Private | 5 |
| Seventh opening range | Local | Public | 2 |
| Eighth opening range | Local | Share | 3 |
| Ninth opening range | Local | Private | 6 |

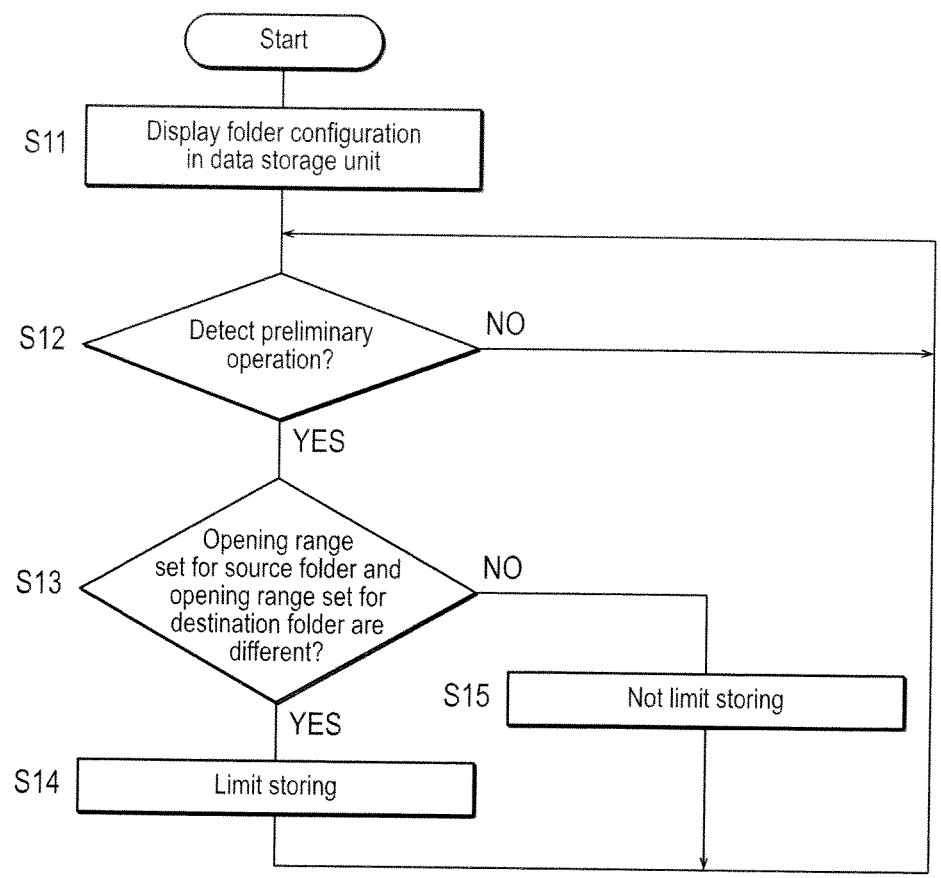

COMPUTER READABLE RECORDING MEDIUM STORING DATA MANAGEMENT PROGRAM, DATA MANAGEMENT APPARATUS, AND DATA MANAGEMENT SYSTEM

CROSS-REFERENCE TO RELATED APPLICATION

This application is based on Japanese Patent Application No. 2012-107824 filed on May 9, 2012, the contents of which are incorporated herein by reference.

BACKGROUND

1. Technical Field

The present invention relates to a computer readable recording medium storing a data management program, a data management apparatus, and a data management system, and particularly relates to a technique of preventing an operation mistake when storing data into a folder.

2. Description of Related Arts

Attention is required when moving or copying data stored in an online storage or the like from a folder (hereinafter, referred to as a source folder) to another folder (hereinafter, referred to as a destination folder) and storing the date in the destination folder. This is because some opening ranges (ranges for permitting an access) may differ, the opening ranges being set for each folder.

For example, in cases where an opening range set for a destination folder is wider than an opening range set for a source folder, there is a possibility of opening data even to a partner to whom the data is not intended to open if a user does not determine carefully. On the other hand, in cases where an opening range set for a destination folder is narrower than an opening range set for a source folder, there is a possibility of not opening data which is needed to be opened.

Therefore, it is convenient to provide limitation in operation so that data is not made to store in a folder different from a source folder contrary to a user's intention.

As a technique of providing limitation in operation, for example, a technique is known in which entering into a predetermined region, where a button not intended to be operated easily are arranged, is permitted only after predetermined time elapses from a time when a pointer arrives at the boundary (Japanese Unexamined Publication No. 2011-511332).

However, according to conventional limitation method, since it is not possible to move a pointer into a predetermined region for a certain period of time, there is a problem that a user's operation is interrupted.

SUMMARY

The present invention is made in view of the above-described circumstances, and an object of the present invention is to provide a computer readable recording medium storing a data management program, a data management apparatus, and a data management system, which can limit storing data in a folder contrary to a user's intention, without interrupting a user's operation.

To achieve at least one of the abovementioned objects, a computer readable recording medium reflecting one aspect of the present invention is a computer readable recording medium storing a data management program which causes a data management apparatus to perform management of data stored in each folder to which an access permission range is set, the data management program causing the data management apparatus to perform steps of: (a) a detection region setting step which sets a detection region for detecting a preliminary operation, which is for storing any data into a destination folder which can store data; and (b) a storing limitation step which limits a storing of the data into the destination folder in cases where the preliminary operation is detected at the set detection region, and the access permission range set for the destination folder is different from the access permission range set for a source folder storing the data originally.

Preferably, in the above-described storing limitation step (b), when limiting the storing of the data, a target region where the storing of the data at the destination folder is accepted is changed from a reference state.

Preferably, in the above-described storing limitation step (b), when the target region is changed from the reference state, at least one of size, shape, position and color of the target region is changed.

Preferably, in the above-described computer readable recording medium, the preliminary operation includes a motion of a cursor for designating the destination folder, and in the above-described storing limitation step (b), when the target region is changed from the reference state, the storing of the data into the destination folder is not permitted in a predetermined direction among directions in which the cursor can enter the target region.

Preferably, in the above-described storing limitation step (b), when the preliminary operation indicates passing a predetermined part of the target region which intersects with a line connecting the source folder and the destination folder, the storing of the data into the destination folder is not permitted.

The objects, features, and characteristics of this invention other than those set forth above will become apparent from the description given herein below with reference to preferred embodiments illustrated in the accompanying drawings.

BRIEF DESCRIPTION OF THE DRAWINGS

FIG. 6 is a drawing illustrating a schematic data structure of opening range data.

FIG. 7 is a flowchart illustrating a procedure of a data storing process according to the first embodiment.

DETAILED DESCRIPTION

Hereinafter, the embodiments of the present invention will be described below with reference to the accompanying drawings. Note that, in the description for drawings, the identical signs are given to the identical elements, respectively, and redundant description is omitted. Moreover, dimension ratio of each drawing is exaggerated for the sake of description, and may differ from an actual ratio.

First Embodiment

Figure 1:
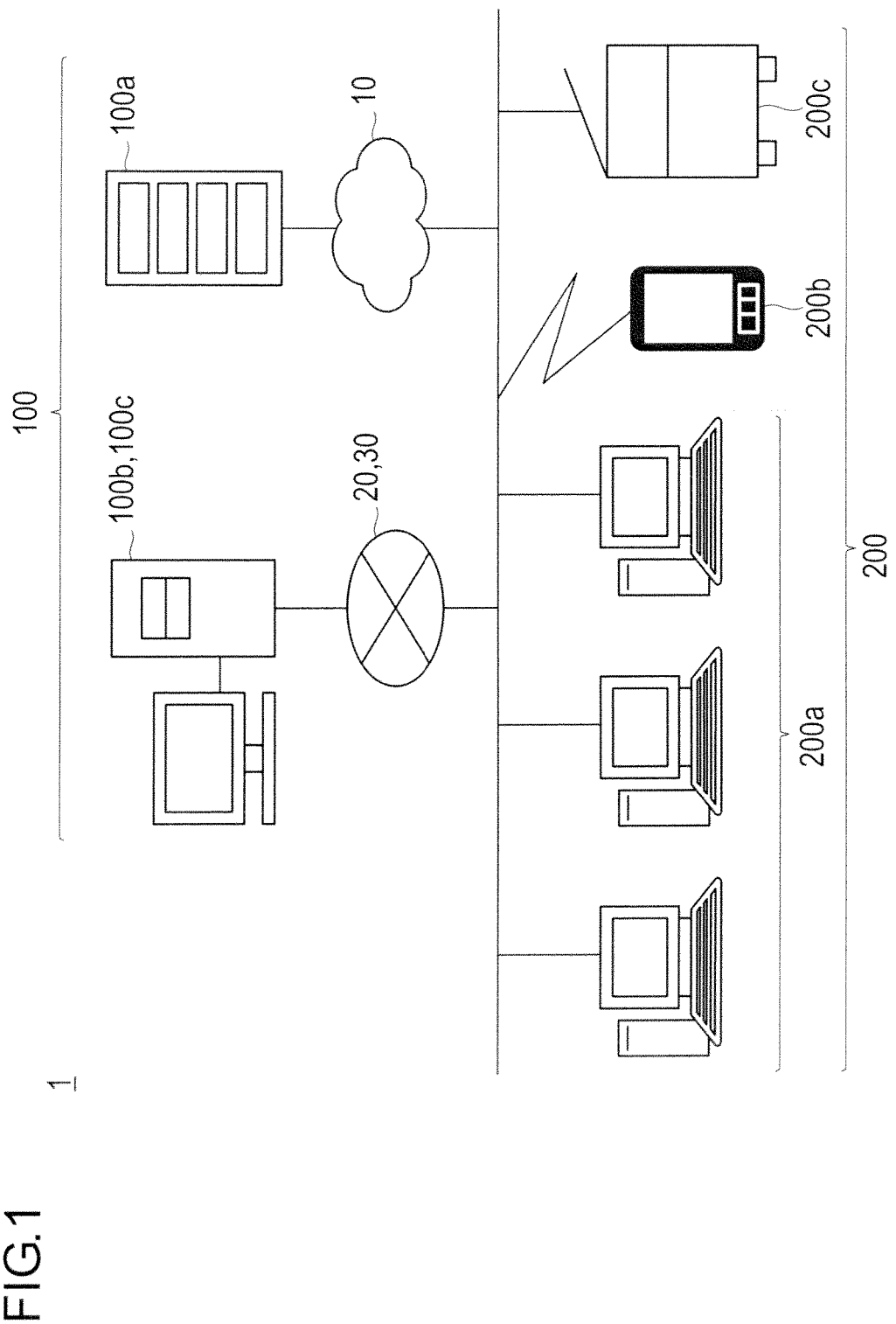
FIG. 1 is a schematic configuration diagram of a printing system according to a first embodiment.

FIG. 1 is a schematic configuration diagram of a printing system 1 according to a first embodiment.

The printing system 1 includes a data management server 100 and a client apparatus 200 as illustrated in FIG. 1. The data management server 100 and the client apparatus 200 are connected so that the data management server 100 and the client apparatus 200 can communicate with each other through a computer network (hereinafter, simply referred to as "network").

The network includes at least one of the Internet (cloud network) 10, an intranet 20, and a local network 30.

The Internet 10 is an open network which provides various services in TCP/IP protocol and higher layers, such as HTTP (Hyper Text Transfer Protocol), Telnet, FTP (File Transfer Protocol), DNS (Domain Name System), SMTP (Simple Mail Transfer Protocol), SNMP (Simple Network Management Protocol), NFS (Network File Service), and NIS (Network Information Service).

The intranet 20 is a network in a company constructed using a standard technique (communications protocol) of the Internet described above, and enables the share of information in a limited range in the company or the like.

The local network 30 includes LAN (Local Area Network) which connects computers and network devices according to the standard such as Ethernet, Token Ring, FDDI (Fiber Distributed Data Interface) or the like, or WAN (Wide Area Network) which connects LANs by a dedicated line, or the like.

The data management server 100 is an information processing device which manages the various data of document files, graphics files, and photograph files and so on. The data management server 100 functions as an online storage which can be written and read by the client apparatus 200 connected through the network.

The data management server 100 is classified into a first data management server 100a which connects with the client apparatus 200 through the Internet 10, a second data management server 100b which connects with the client apparatus 200 through the intranet 20, and a third data management server 100c which connects with the client apparatus 200 through the local network 30.

In the example illustrated in FIG. 1, all data management servers 100 including the first to third data management servers 100a, 100b and 100c are connected to the network in the printing system 1, but it is not limited to this manner. It is only necessary to connect at least one of the first to third data management servers 100a, 100b and 100c to the network in the printing system 1, and the number of servers is not limited to the illustrated example.

The client apparatus 200 is an information processing device which can use the data management server 100 as the online storage.

The client apparatus 200 is classified into personal computers (PCs) 200a, a mobile terminal 200b which is a portable computer carried by a user, and an image forming apparatus 200c which includes at least a function of forming an image.

The mobile terminal 200b includes a cellular phone, a smartphone, a tablet computer and the like. Moreover, the image forming apparatus 200c includes a printer, a copying machine, a facsimile machine, a composite machine and the like.

In the example illustrated in FIG. 1, all client apparatuses 200 including the PC 200a, the mobile terminal 200b and the image forming apparatus 200c are connected to the network in the printing system 1, but it is not limited to this manner. It is only necessary to connect at least one of the PC 200a, the mobile terminal 200b, and the image forming apparatus 200c to the network in the printing system 1, and the number of such apparatuses is not limited to the illustrated example.

Figure 2:
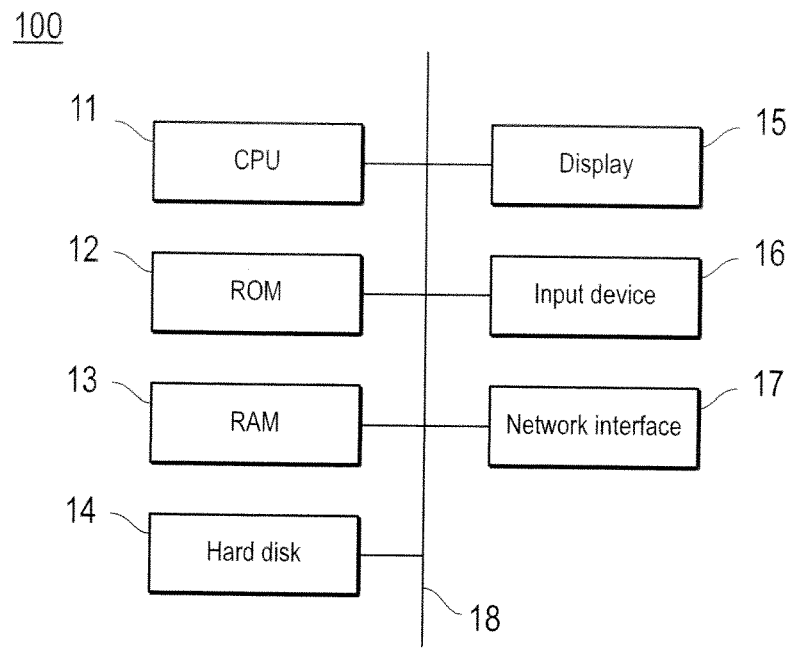
FIG. 2 is a block diagram illustrating a schematic structure of a data management server.

FIG. 2 is a block diagram illustrating an example of a schematic structure of the data management server (first to third data management servers 100a, 100b and 100c).

As illustrated in FIG. 2, the data management server 100 includes a CPU (Central Processing Unit) 11, a ROM (Read Only Memory) 12, a RAM (Random Access Memory) 13, a hard disk 14, a display 15, an input device 16, and a network interface 17. These components are connected one another through a bus 18 for exchanging a signal.

The CPU 11 controls above-described components and performs various data processing in accordance with a program. The ROM 12 stores various programs and various data. The RAM 13 stores programs and data temporarily as workspace.

The hard disk 14 stores various programs including an operating system and various data. In the hard disk 14, a file creation application for creating document files such as a text file, a graphics file and a photograph file has been installed.

The display 15 is, for example, a liquid crystal display and displays various information items. The input device 16 includes, for example, a pointing device such as a mouse and a keyboard, and is used in order to input various information items. The network interface 17 is an interface for communicating with other apparatuses through a network, and employs a standard, such as IPv4, IPv6, Ethernet, Token Ring, FDDI or the like.

Figure 3:
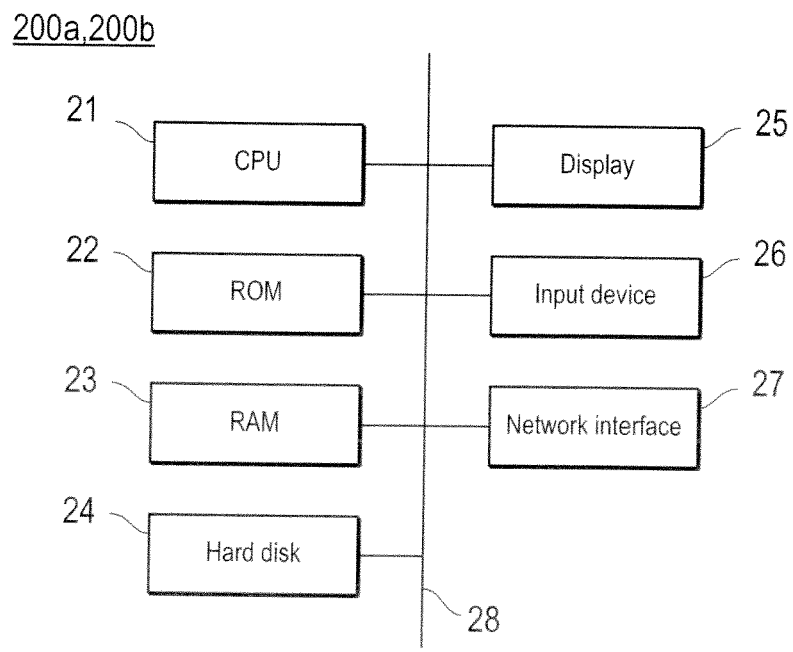
FIG. 3 is a block diagram illustrating a schematic structure of a client apparatus (a PC, a mobile terminal).

FIG. 3 is a block diagram illustrating an example of a schematic structure of the client apparatus 200 (in particular, the PC 200a and the mobile terminal 200b).

As illustrated in FIG. 3, the PC 200a and the mobile terminal 200b include a CPU 21, a ROM 22, a RAM 23, a hard disk 24, a display 25, an input device 26, and a network interface 27, respectively. These components are connected one another through a bus 28 for exchanging a signal.

Note that the description is omitted for components which have the substantially same function as the components of the data management server 100 among the above-described components of the PC 200a and the mobile terminal 200b.

The display 25 is, for example, a liquid crystal display or a touch panel, and displays various information items.

The input device 26 includes, for example, a pointing device such as a mouse, a keyboard and a touch panel, and is used in order to input various information items.

Figure 4:
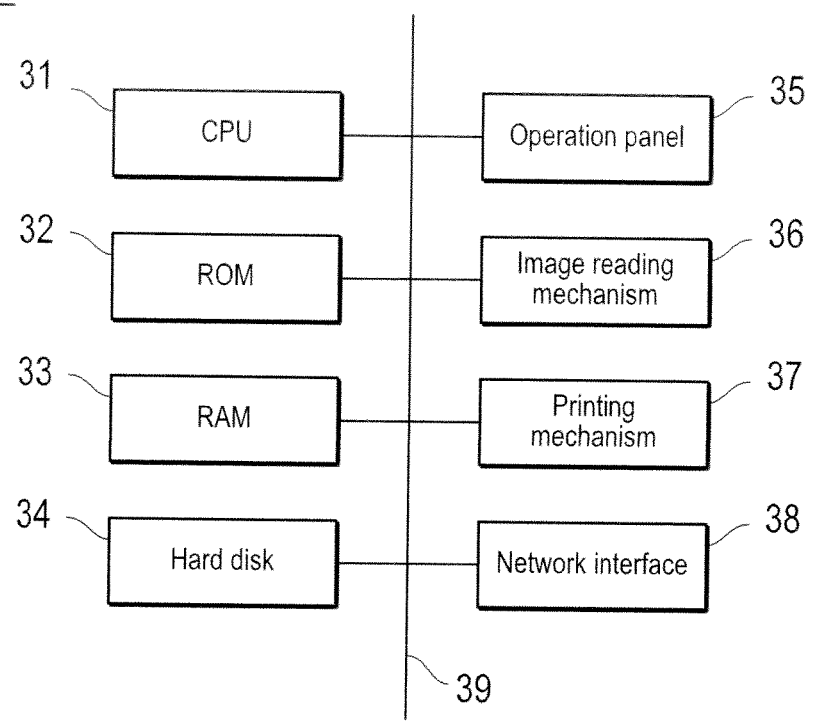
FIG. 4 is a block diagram illustrating a schematic structure of a client apparatus (image forming apparatus).

FIG. 4 is a block diagram illustrating an example of a schematic structure of the client apparatus 200 (in particular, the image forming apparatus 200c).

As illustrated in FIG. 4, the image forming apparatus 200c includes a CPU 31, a ROM 32, a RAM 33, a hard disk 34, an operation panel 35, an image reading mechanism 36, a printing mechanism 37, and a network interface 38. These components are connected one another through a bus 39 for exchanging a signal.

Note that the description is omitted for components which have the substantially same function as the components of the data management server 100, the PC 200a and the mobile terminal 200b among the above-described components of the image forming apparatus 200c.

The operation panel unit 35 is used for displaying various information items, and inputting various instructions. The image reading mechanism 36 includes general components for realizing a scanning function, and reads a document placed on a document table to form an image. The printing mechanism 37 prints the image or the like based on the image data in the bit map form obtained by decompressing a print job on recording medium such as a paper, using the well-known imaging process such as an electrophotographic process. Moreover, the printing mechanism 37 may include a mechanism for performing finishing processes such as a staple process, a punch hole generating process, a bending process to the paper on which the image is formed.

Note that the data management server 100 and the client apparatus 200 may include components other than the above-described components, or may not include a part of above-described components.

Figure 5:
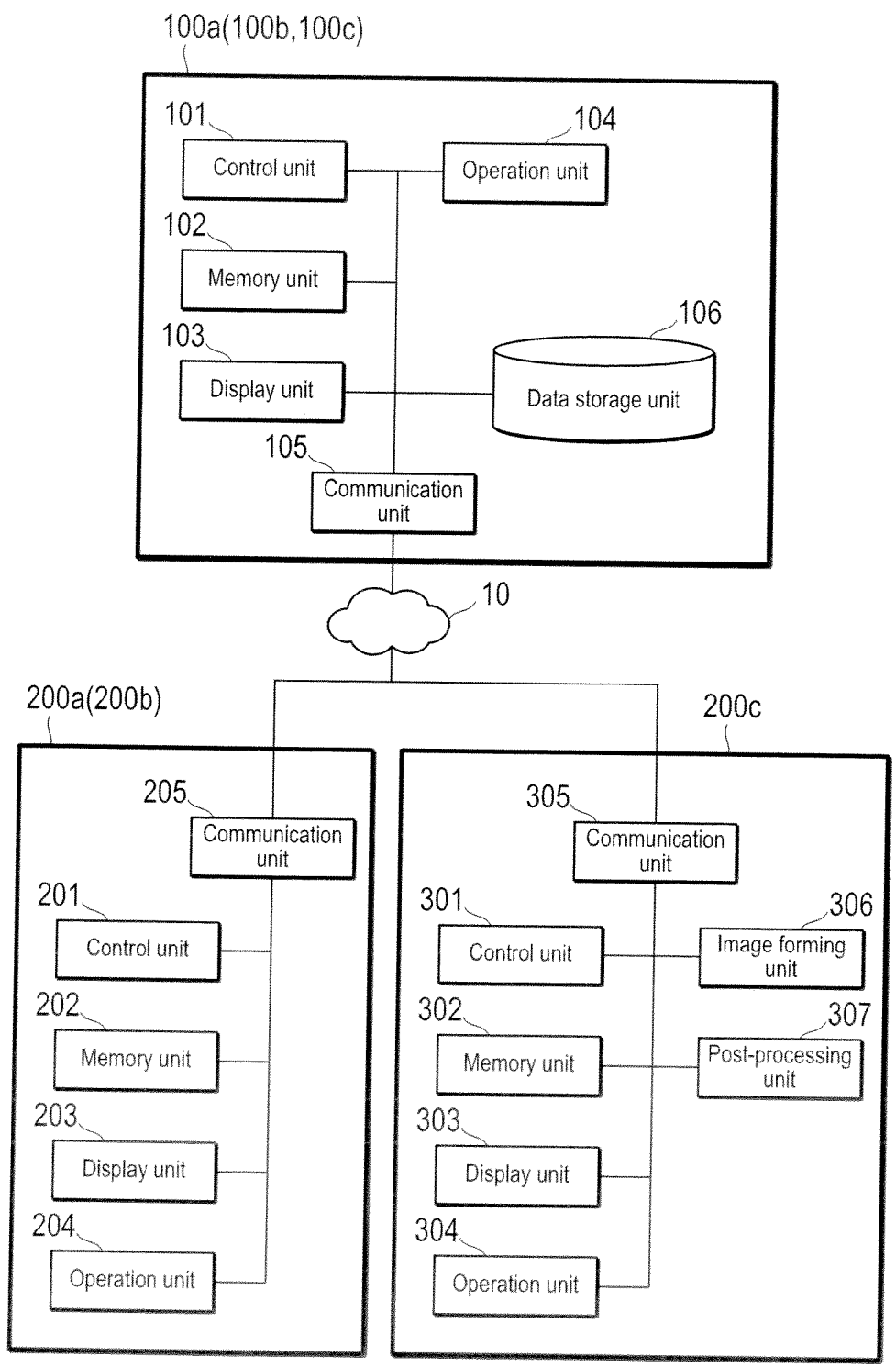
FIG. 5 is a block diagram illustrating a fundamental software structure of the printing system.

FIG. 5 is a block diagram illustrating an example of a fundamental software structure of the printing system 1. In the printing system 1 of the first embodiment, a storing location of data stored in the data management server 100 is changed by a remote control from the client apparatus 200 through the network (for example, a file is moved between folders).

The data management server 100 includes, as illustrated in FIG. 5, a control unit 101, a memory unit 102, a display unit 103, an operation unit 104, a communication unit 105, and a data storage unit 106.

The control unit 101 controls entire data management server 100. Specifically, the control unit 101 manages and controls respective function units 102 to 106 described below by reading a predetermined program and various data stored in the ROM 12 or the hard disk 14 to the RAM 13, and performing the program by the above-described CPU 11.

The memory unit 102 stores various data. For example, the memory unit 102 stores information (opening range data 300 described below) defining an opening range (it is also called "access permission range"). The information defining an opening range indicates that the data stored in the data storage unit 106 described below is to be opened (in other words, accesses are permitted) to computers only on the local network 30, the data is to be further opened to computers on the intranet 20, and the data is to be still further opened to computers on the Internet 10.

Note that the memory unit 102 is realized by the ROM 12, the RAM 13, the hard disk 14, which are described above, or other storage medium (a flash memory or the like), for example. Preferably, the memory unit 102 is non-volatile secondary memory device.

The display unit 103 displays various screens for the maintenance of the data management server 100 and the like. For example, the display unit 103 is realized by the display 15 described above.

The operation unit 104 receives the inputs of various information items from a user. For example, the operation unit 104 is realized by the input device 16 described above.

The communication unit 105 connects the data management server 100 to the network, and transmits and receives various data with the client apparatus 200. For example, the communication unit 105 is realized by the network interface 17 described above.

The data storage unit 106 includes a storage area which can be accessed from the client apparatus 200 through a network, and stores the various data such as a text file, a graphics file, and a photograph file. For example, the data storage unit 106 is realized by the hard disk 14 described above and a database.

The client apparatus 200 which is the PC 200a or the mobile terminal 200b includes a control unit 201, a memory unit 202, a display unit 203, an operation unit 204, and a communication unit 205, as illustrated in FIG. 5.

The control unit 201 controls entire client apparatus 200 (the PC 200a, the mobile terminal 200b). Specifically, the control unit 201 manages and controls respective function units 202 to 206 described below by reading a predetermined program and various data stored in the ROM 22 or the hard disk 24 to the RAM 23, and performing the program by the above-described CPU 21.

The memory unit 202 stores various data. For example, the memory unit 202 stores the data to be uploaded to the data management server 100 and so on.

Note that the memory unit 202 is realized by the ROM 22, the RAM 23, the hard disk 24, which are described above, or other storage medium (a USB memory or the like), for example. Preferably, the memory unit 202 is non-volatile secondary memory device.

The display unit 203 displays a screen or the like for operation (remote control) of changing the storing location of the data stored in the data management server 100. For example, the display unit 203 is realized by the display 25 described above. In cases where GUI (Graphical User Interface) or the desktop environment of the data management server 100 is operated from the client apparatus 200 by the remote control, general remote desktop technology ("RDP (Remote Desktop Protocol)," "X Window System," or the like) can be used.

The operation unit 204 receives the inputs of various information items from a user. For example, the operation unit 204 is realized by the input device 26 described above.

The communication unit 205 connects the client apparatus 200 (the PC 200a, the mobile terminal 200b) to the network, and transmits and receives various data with the data management server 100. For example, the communication unit 205 is realized by the network interface 27 described above.

Moreover, the client apparatus 200 which is the image forming apparatus 200c includes a control unit 301, a memory unit 302, a display unit 303, an operation unit 304, a communication unit 305, an image forming 306, and a post-processing unit 307, as illustrated in FIG. 5.

The control unit 301 controls entire client apparatus 200 (the image forming apparatus 200c). Specifically, the control unit 301 manages and controls respective function units 302 to 307 described below by reading a predetermined program and various data stored in the ROM 32 or the hard disk 34 to the RAM 33, and performing the program by the above-described CPU 31.

The memory unit 302 stores various data. For example, the memory unit 302 stores the data to be uploaded to the data management server 100 and so on.

Note that the memory unit 302 is realized by the ROM 32, the RAM 33, the hard disk 34, which are described above, or other storage medium (a USB memory, an SD card, or the like), for example.

The display unit 303 displays a screen or the like for operation (remote control) of changing the storing location of the data stored in the data management server 100. For example, the display unit 303 is realized by the display 35 described above.

The operation unit 304 receives the inputs of various information items from a user. For example, the operation unit 304 is realized by the input device 35 described above.

The communication unit 305 connects the client apparatus 200 (image forming apparatus 200c) to the network, and transmits and receives various data with the data management server 100. For example, the communication unit 305 is realized by the network interface 38 described above.

The image forming unit 306 prints the image based on the image data in a bit map form obtained by decompressing a print job on recording media, such as a paper, using the well-known imaging process such as an electrophotographic process. For example, the image forming unit 306 is realized by the image reading mechanism 36 and the printing mechanism 37 which are described above.

The post-processing unit 307 performs the finishing processes such as a staple process, a punch hole generating process, a bending process to the paper on which the image is formed by the image forming unit 306. For example, the post-processing unit 307 is realized by the printing mechanism 37 described above.

<Data Storing Process According to First Embodiment>

Hereinafter, the data storing process according to the first embodiment will be described, Before describing the concrete contents of the data storing process, it will be described an example of setting, conditions or the like, which are the premise of the process.

Various data (text data, image data and the like) is stored in advance in the data storage unit 106 of the data management server 100 (the first to third data management servers 100a, 100b and 100c). The various data is managed by the control unit 101 by storing the data for each folder.

The control unit 101 of the data management server 100 sets an opening range (access permission range) in advance of the data storing process, for each folder of the data storage unit 106 in which the various data is organized and stored.

Specifically, the opening range is set in accordance with a combination of a type of a network to which a computer of the communication partner is connected, and a user type.

For example, any one of a first network range which permits accesses from the computers on all networks of the Internet 10, the intranet 20 and the local network 30, a second network range which permits accesses from the computers on the intranet 20 and the local network 30, and a third network range which permits accesses from the computers on the local network 30 is set.

Any one of a first access authority (also called "public") which permits accesses from all users utilizing the computers of the communication partners, a second access authority (also called "share") which permits accesses from some users (or a group) utilizing the computers of the communication partners, and a third access authority (also called "private") which permits accesses only from the users (holders) having the file of an access target among the users utilizing the computers of the communications partners is set.

A combination of the first network range and the first access authority is called "first opening range." A combination of the first network range and the second access authority is called "second opening range." A combination of the first network range and the third access authority is called "third opening range."

Similarly, a combination of the second network range and the first access authority is called "fourth opening range." A combination of the second network range and the second access authority is called "fifth opening range." A combination of the second network range and the third access authority is called "sixth opening range."

Moreover, a combination of the third network range and the first access authority is called "seventh opening range." A combination of the third network range and the second access authority is called "eighth opening range." A combination of the third network range and the third access authority is called "ninth opening range."

Therefore, any of first to ninth opening range will be set to each folder of the data storage unit 106 in which the various data is organized and stored.

The widest opening range (access permission range) is the first opening range among the first to ninth opening ranges. The second widest opening range is the second, the fourth, and the seventh opening ranges. The third widest opening range is the fifth, and the eighth opening ranges. The fourth widest opening range is the third opening range. The fifth widest opening range is the sixth opening range. The narrowest opening range is the ninth opening range.

The setting information of the opening range as described above is held in the opening range data 300 in the memory unit 120.

FIG. 6 is a drawing illustrating an example of a schematic data structure of the opening range data 300. As illustrated in FIG. 6, the opening range data 300 includes records 350. In each record 350, at least a setting name 310, a network on which data is opened 320, an access authority 330, a width of opening range 340 are associated. The setting name 310 includes data indicating the name of the opening range set for each folder, and for example, is character string such as "first opening range" and "second opening range" which are described above. The network on which data is opened 320 includes data indicating the range of the network from which an access is permitted, and for example, is character string such as "first opening range" and "second opening range" which are described above. The access authority 330 includes data indicating the range of the user from which an access is permitted, and for example, is character string such as "public," "share," and "private," which are described above. The width of opening range 340 includes data indicating an order about the width of opening range.

As described above, the opening range (the access permission range) has been set for each folder of the data storage unit 106 in which various data are organized and stored.

Figure 8:
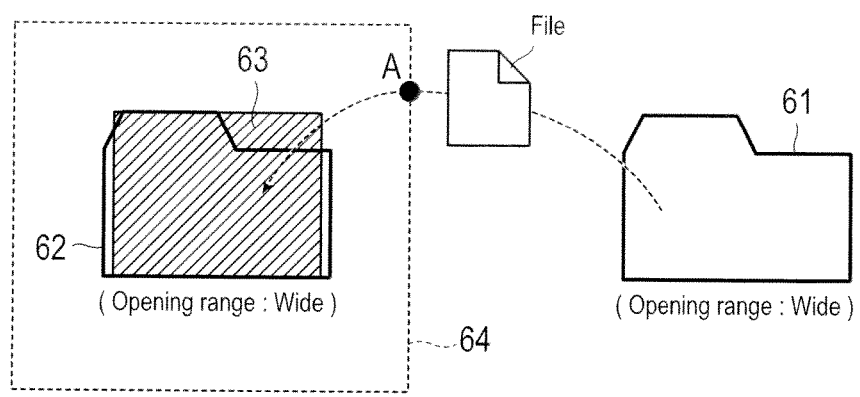
FIG. 8 is a drawing illustrating an example of a target region in a reference state.

FIG. 7 is a flowchart illustrating an example of a procedure of the data storing process according to the first embodiment, FIG. 8 is a drawing illustrating an example of folder icons displayed in the client apparatus 200, and FIG.

9 is a drawing illustrating an example of the target region 63 where size is changed at step S14.

The data storing process according to the first embodiment is performed by the client apparatus 200. Although it will be hereinafter described an example in which the process is performed by the PC 200a among the client apparatus 200, the mobile terminal 200b and the image forming apparatus 200c may perform the process. Moreover, an algorithm illustrated by the flowchart of FIG. 7 is stored as a program in the ROMs 22 and 32 or the hard disks 24 and 34 of the client apparatus 200, and is performed by the CPUs 21 and 31. In an example illustrated in FIG. 8, a plurality of folder icons are displayed on the display unit 203 of the client terminal 200.

The control unit 201 of the PC 200a accesses to any folder of the data management server 100 in accordance with the instruction from the user operating the operation unit 204. The control unit 201 starts the flowchart illustrated in FIG. 7 with the access. Alternatively, in another embodiment of the present invention, a data storage unit may be provided in the PC 200a itself in addition to the data storage unit in the data management server 100. In this case, the flowchart of FIG. 7 may be started by accessing to the any folder in such local data storage unit.

First, the control unit 201 receives the data indicating folder configuration (such as hierarchy of folders, data and other folders included in the folder) in the data storage unit 106 accessed by the user's operation through the communication unit 205 from the data management server 100, and displays the data on the display unit 203 as a folder icon indicating the folder or a file icon indicating the file such as the document data and the like (step S11).

The control unit 201 provides a target region 63 (shaded region in FIG. 8), for each of the folder icons 61 and 62, where a storing of any data (document file and the like) is accepted.

Moreover, the control unit 201 provides a detection region 64 (a region surrounded by the dotted line in FIG. 8) which detects a preliminary operation for storing any data (document file and the like) for each of the folder icons 61 and 62. Note that the size of the detection region 64 is set at least equal to or more than the size of the target region 63.

In a state in which the target region 63 and the detection region 64 are provided for each of folder icons 61 and 62, the control unit 201 determines whether or not the preliminary operation is made for storing any data (document file and the like) to any folder (step S12). Specifically, the control unit 201 determines that the preliminary operation is made for storing the data to the folder, in cases where a cursor (for example, mouse pointer) enters into the detection region 64 (a point A illustrated in FIG. 8) in a state where any data is designated (for example, in a state where an icon of the document file is dragged).

In cases where the preliminary operation is not performed (step S12: No), the control unit 201 continues the observation whether the preliminary operation is made by repeating the process of step S12.

In cases where the control unit 201 detects that the preliminary operation is made on the other hand (step S12: Yes), the control unit 201 compares the opening range set for a destination folder (a folder corresponding to the folder icon 62 in the illustrated example) in which data will be stored by the detected preliminary operation, and the opening range set for a source folder (a folder corresponding to the folder icon 61 in the illustrated example) storing the data originally (step S13). For example, the control unit 201 acquires the opening range data 300 from the data management server 100 through the communication unit 205, and specifies the opening ranges (in other words, setting names 310) set for respective the destination folder and the source folder. Then, the control unit 201 compares the widths of specified opening ranges (in other words, widths of opening ranges 340 associated with the specified setting names 310), and determines whether the widths of opening ranges differ.

In cases where the widths of opening ranges set for the destination folder and the source folder differ (step S13: Yes), the control unit 201 proceeds to step S14.

The control unit 201 limits the storing of the data to the destination folder (step S14). For example, the control unit 201 limits the storing of the data to the destination folder by changing the target region 63 provided for the destination folder from a reference state. The reference state of the target region 63 is, as illustrated by the shaded region in FIG. 8, a state in which the target region 63 is provided at the approximately same position as the folder icon 62, and has a rectangular region the size of which is the approximately same as the folder icon 62. At step S14, the control unit 201 makes the size of the target region 63 smaller than the reference state.

Figure 9:
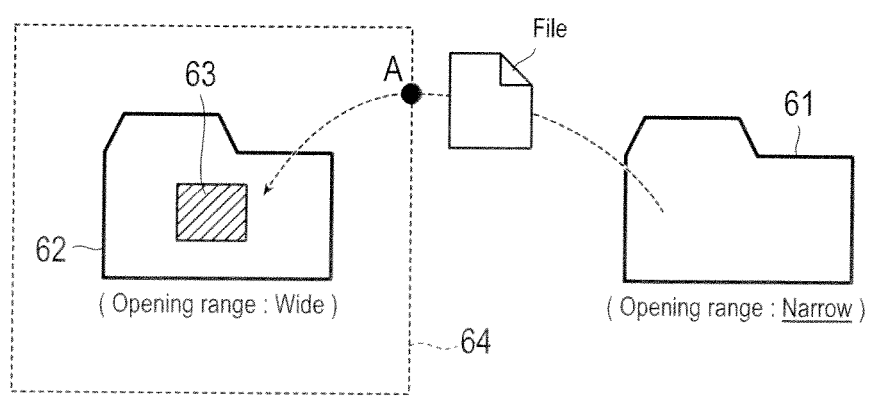
FIG. 9 is a drawing illustrating an example of the target region changed from the reference state.

As illustrated in FIG. 9, since the target region 63 is smaller than the reference state, the data is unstorable in the destination folder unless a precise operation for storing (for example, a drop) data (for example, an icon of a document file) into the center part of the folder icon 62 is performed. The precise operation for storing data into the center part of the folder icon is, for example, an operation which drags and drops an icon of a document file into the target region 63 which has been smaller than the reference state. In this way, the storing of the data to the destination folder can be limited.

In cases where the width of opening range set for the destination folder matches the width of opening range set for the source folder (step S13: No), it proceeds to step S15.

At step S15, the control unit 201 makes it unlimited about the storing of the data to the destination folder (step S15). For example, the control unit 201 makes it unlimited about the storing of the data to the destination folder by maintaining the reference state of the target region 63 provided in the destination folder.

It returns to the step S12 after finishing the process of step S14 or S15, and the processes are repeated.

By performing above-described data storing process by the PC 200a, the data is hard to be stored in a destination folder and the storing can be limited in cases where the opening range set for the source folder and the opening range set for the destination folder differ.

By this means, even when the opening range set for the destination folder is wider than the opening range set for the source folder, for example, it is possible to avoid to unconsciously open the data to a partner to whom the data is not intended to open. In other words, limiting the storing notifies the user of a fact that the user will expand the opening range.

When the opening range set for the destination folder is narrower than the opening range set for the source folder, it is possible to avoid to unconsciously make data non-public, the date being needed to be disclosed. In other words, it notifies the user of a fact that the user will reduce the opening range.

Since the movement of cursor (for example, mouse pointer) is not limited, it is possible to limit the change of the opening range which is not intended, without interrupting a user's operation.

Note that a unit of division of the flowchart into each process described above is according to the main contents of the process, for the sake of facilitating an understanding of the printing system 1. The present invention is not limited by the manner of a classification of the process steps, and those names. The processes performed by the PC 200*a* can be divided into much more process steps. Moreover, one process step may perform much more processes.

The above-described first embodiment intends to exemplify the gist of the present invention, and does not limit the present invention. It is clear for a person skilled in the art that many substitutes, corrections, and modifications can be made.

For example, the above-described first embodiment describes the example in which the control unit 201 makes the size of the target region 63 smaller than the reference state at step 914. However, it is not limited to this manner, and at least one of the size, shape, and position of the target region 63 may be changed. Note that, in one aspect which visually, expressly provides the target region 63 to a user, the color of the target region 63 may be changed into a color (for example, red) which calls user's attention.

Figure 10A:
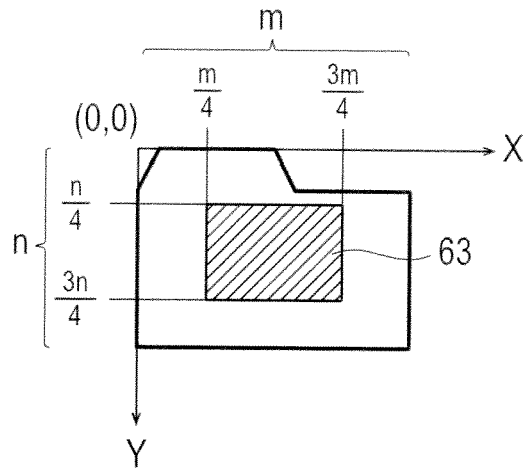
FIG. 10A is a drawing illustrating a first modification of the target region according to the first embodiment.
Figure 10B:
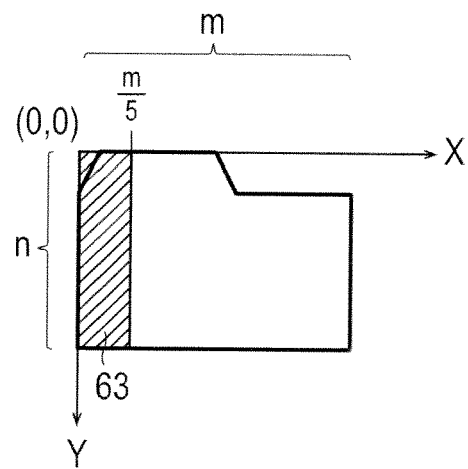
FIG. 10B is a drawing illustrating a second modification of the target region according to the first embodiment.
Figure 10C:
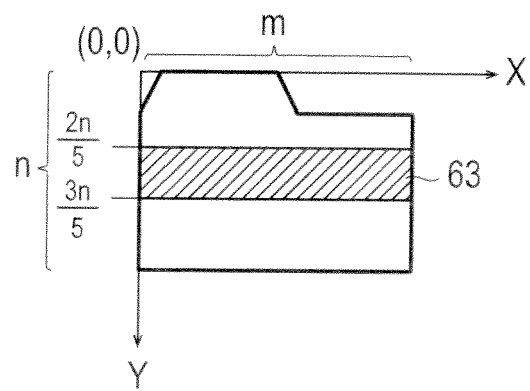
FIG. 10C is a drawing illustrating a third modification of the target region according to the first embodiment.

FIGS. 10A to 10C are drawings illustrating various modifications of the target region 63. FIG. 10A is a drawing illustrating a first modification of the target region 63. Now, the length of the width direction (X-axis direction) of the folder icon is denoted by "m", and the length of the height direction (Y-axis direction) of the folder icon is denoted by "n." In this case, the control unit 201 may set, as the target region 63, a region in range the width of which is from "m/4" to "3m/4", and the height of which is from "n/4" to "3n/4." By this means, a rectangle-shaped target region 63 can be provided in the center part of the folder icon.

FIG. 10B is a drawing illustrating a second modification of the target region 63. As illustrated in FIG. 10B, the control unit 201 may set, as the target region 63, a region in range the width of which is from "0" to "m/5", and the height of which is from "0" to "n." By this means, the target region 63 can be provided so as to put aside at an end (left end) of the folder icon. The end of the folder icon, to which the target region 63 is put aside, may be changed arbitrarily to another end thereof according to the position relationship of the source folder and the destination folder. For example, the target region 63 may be puts aside on an end of the folder icon of the destination folder, the end being far side from the source folder.

FIG. 10C is a drawing illustrating a third modification of the target region 63. As illustrated in FIG. 10C, the control unit 201 may set, as the target region 63, a region in range the width of which is from "0" to "m," and the height of which is from "2n/5" to "3n/5." By this means, the elongate target region 63 can be provided in the center part of the folder icon.

It is needless to say that the shape of the target region 63 may be a shape other than rectangle, such as a circle, an ellipse, and a polygon. Moreover, the control unit 201 may expressly display the target region 63 on the display unit 203. The control unit 201 may display the target region 63 with a color (for example, red) for emphasizing.

In the above-described first embodiment, the detection region 64 has a rectangle shape, but it is not limited to this shape. The detection region 64 may have any shape as long as the size of the detection region is at least equal to or more than the size of the target region 63.

Moreover, in the above-described first embodiment, the control unit 201 acquires the opening range data 300 from the data management server 100 at step S13. However, it is not limited to this manner, but the control unit 201 may acquire the date from the data management server 100 in advance of the start of the flowchart illustrated in FIG. 7.

Second Embodiment

Next, a second embodiment of the present invention will be described.

In the above-described first embodiment, the control unit 201 of the PC 200*a* limits the storing of the data to the destination folder by making the size of the target region 63 smaller than the reference state.

On the other hand, in the second embodiment, the control unit 201 does not permit the storing of the data into the destination folder in a predetermined direction among directions in which a cursor (for example, mouse pointer) can enter the target region 63.

Note that the printing system 1 according to the second embodiment has the same hardware configuration and the same functional component as the first embodiment, but has some different behaviors from the printing system 1 according to the first embodiment. Hereinafter, description of the second embodiment is made focusing on the different parts from the first embodiment.

<Data Storing Process According to Second Embodiment>

Figure 11:
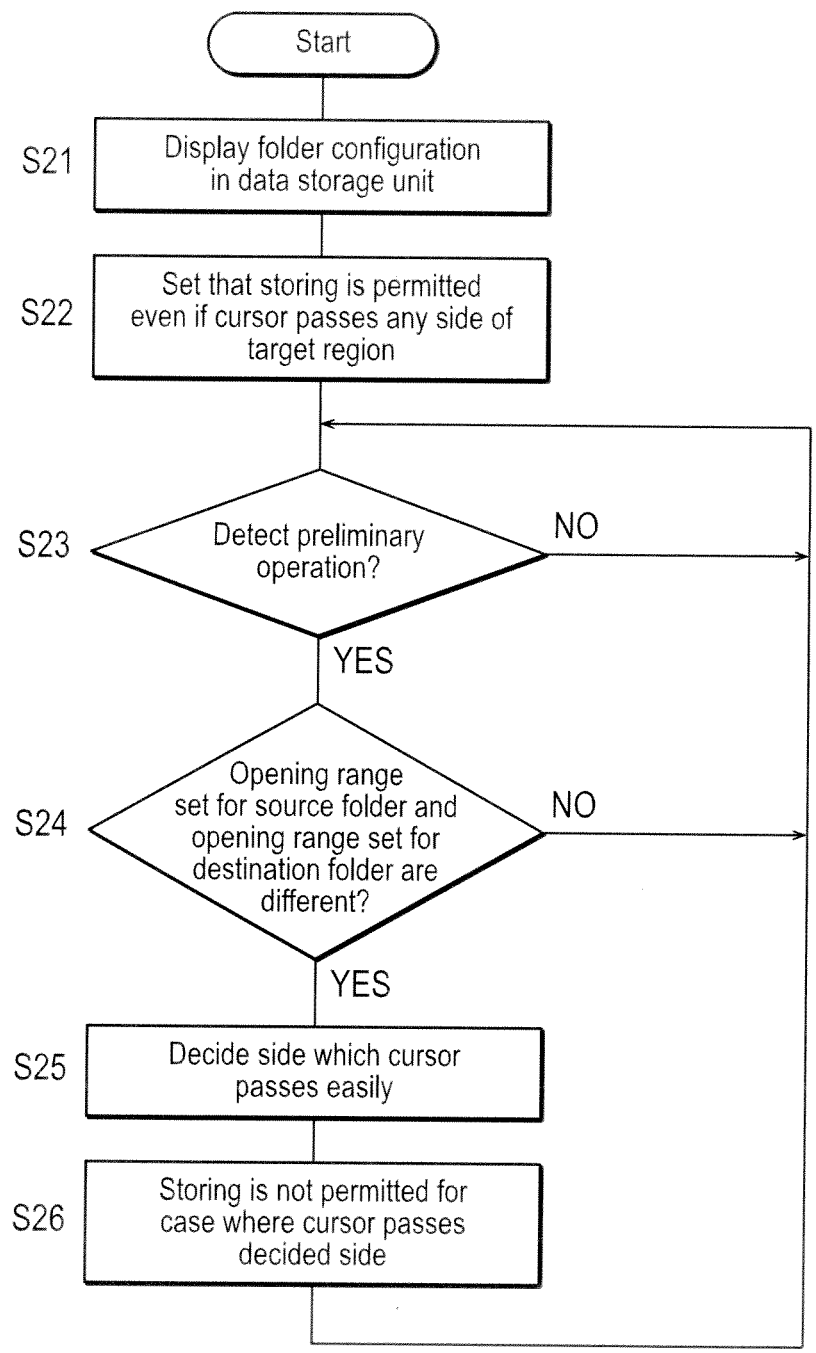
FIG. 11 is a flowchart illustrating a procedure of a data storing process according to a second embodiment.
Figure 12:
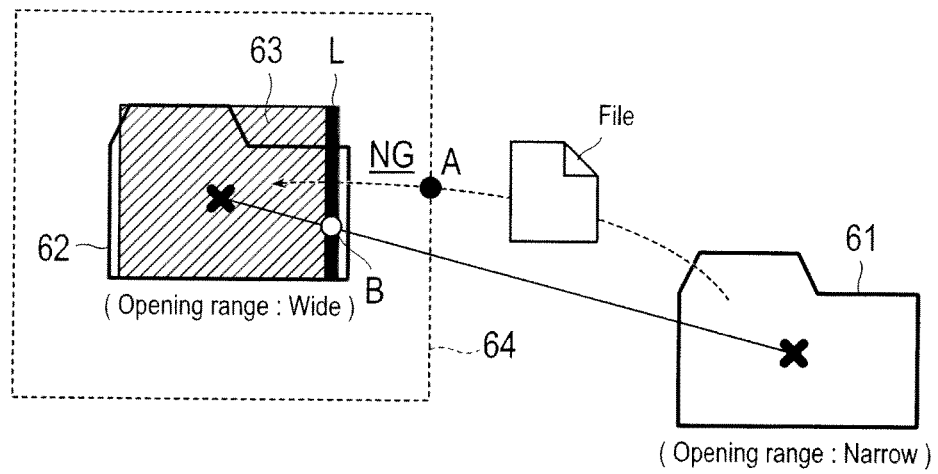
FIG. 12 is a drawing illustrating an example of the target region which limits a storing from some directions (a case which cannot store).
Figure 13:
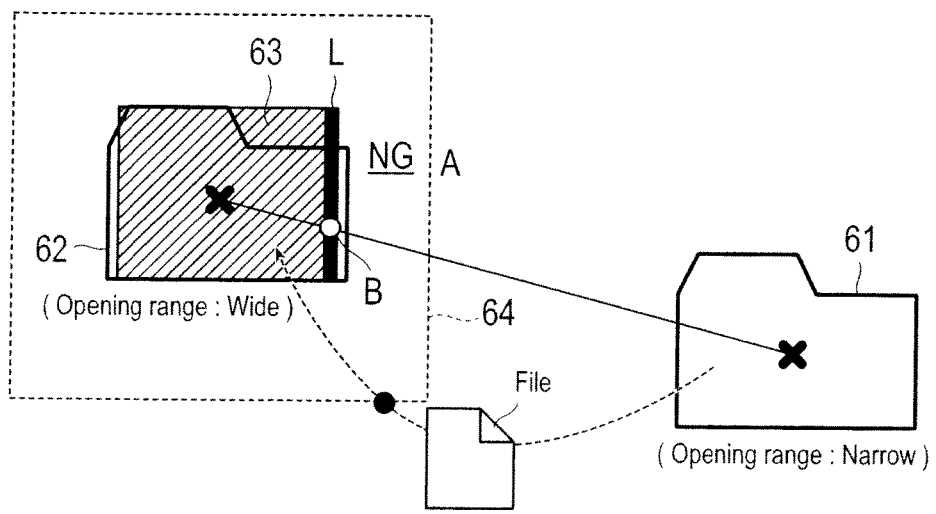
FIG. 13 is a drawing illustrating an example of the target region which limits a storing from some directions (a case which can store).

FIG. 11 is a flowchart illustrating an example of a procedure of a data storing process according to the second embodiment. FIG. 12 is a drawing illustrating an example of the folder icons displayed in the client apparatus. FIG. 13 is a drawing illustrating an example which limits storing from some directions, but does not limit storing from other directions. The data storing process according to the second embodiment is also performed by the client apparatus 200. Although it will be hereinafter described an example in which the process is performed by the PC 200*a* among the client apparatus 200, the mobile terminal 200*b* and the image forming apparatus 200*c* may perform the process. Moreover, an algorithm illustrated by the flowchart of FIG. 11 is stored as a program in the ROMs 22 and 32 or the hard disks 24 and 34 of the client apparatus 200, and is performed by the CPUs 21 and 31. In an example illustrated in FIG. 12, a plurality of folder icons 61, 62 are displayed on the display unit 203.

As is the case with the first embodiment, also in the second embodiment, various data (text data, image data and the like) is stored in the data storage unit 106 of the data management server 100 in advance of the start of the flowchart illustrated in FIG. 11. The various data is managed by the control unit 101 by storing the data for each folder.

The opening range (the access permission range) is also set for each folder in advance.

Then, the control unit 201 of the PC 200*a* accesses any folder of the data management server 100 in accordance with the instruction from the user operating the operation unit 204. The control unit 201 starts the flowchart illustrated in FIG. 11 with the access.

First, the control unit 201 performs a process which is the substantially same as the step S11 described in the above-described first embodiment, to display a folder icon on the display unit 203 (step S21).

As is the case with the first embodiment, the control unit 201 provides the target region 63 (shaded region in FIG. 12), for each of the folder icons 61 and 62, where a storing of any data (document file and the like) is accepted.

Moreover, the control unit 201 provides the detection region 64 (a region surrounded by the dotted line in FIG. 12)

which detects a preliminary operation for storing any data (document file and the like) for each of the folder icons 61 and 62.

Next, even if the cursor (for example, mouse pointer) passes any part of the outer edge (four sides located on four directions in cases where the target region 63 is a rectangle) of the target region 63 provided for each folder icon, the control unit 201 sets so that the storing of data in the destination folder is permitted (step S22). In other words, the control unit 201 allows an entering of the cursor (for example, mouse pointer) into the target region 63 from every direction, even if any data is designated (for example, it is in a state in which the icon of the document file is dragged).

Next, the control unit 201 performs the processes as is the case with step S12 and S13 described in the first embodiment (step S23, S24). More specifically, the control unit 201 determines whether or not the preliminary operation for storing any data (document file or the like) into the folder has been made. The control unit 201 compares the opening range set for the destination folder with the opening range set for the source folder, when detecting that the preliminary operation has been made at the point A illustrated in FIG. 12, for example.

Then, the control unit 201 returns to step S23, in cases where the width of opening range set for the destination folder matches the width of opening range set for the source folder (step S24: No), since it is not necessary to change the state of the target region 63.

On the other hand, in cases where the width of opening range set for the destination folder is different from the width of opening range set for the source folder (step S24: Yes), the control unit 201 proceeds to step S25.

At step S25, the control unit 201 decides an outer edge of the target region 63 for limiting the storing (step S25). For example, when the target region 63 has a rectangle shape, the control unit 201 decides, as the outer edge for limiting the storing, one side of the four directions of the target region 63 which intersects with a line (for example, straight line) connecting the destination folder and the source folder. The line connecting the destination folder and the source folder may be a line connecting a central point of the folder icon 62, and a central point of the folder icon 61. Besides, either or both the source folder and the destination folder may be decompressed, and may be displayed as folder windows. When both are displayed as folder windows, the line may connects the central point of one window, and the central point of the another window. When only one is displayed as a folder window, the line may connect the central point of the window, and the central point of the folder icon. Alternatively, the line may connect the central points of the folder icon 62 and the folder icon 61, regardless of displaying folder window.

In an example illustrated in FIG. 12, the line connecting the central point of the folder icon 62 and the central point of the folder icon 61 intersects with the outer edge part of the target region 63 at a point B (white circle). Therefore, the control unit 201 decides the right-hand side (illustrated by thick line) among the sides forming the outer edge of the target region 63 as the side regarding limitation of the storing (icon 61 side of the source folder).

Next, the control unit 201 changes the state of the target region 63 provided for the destination folder from the state (reference state) set at step S22, thereby limiting the storing of the data to the destination folder (step S26). For example, the control unit 201 sets that the storing of the data to the destination folder cannot be performed when a cursor passes the outer edge part decided at step S25.

On the other hands, the storing of the data to the destination folder is permitted when the cursor passes parts other than the outer edge part decided at step S25.

As illustrated in FIG. 13, the control unit 201 permits the storing of the data to the destination folder, when a cursor passes through the sides (top, left and bottom sides of the target region 63) other than the side (thick line) decided that the cursor will pass at step S25. Therefore, data cannot be stored into the destination folder when data is linearly moved toward the destination folder from the source folder on the display. On the other hand, data can be stored into the destination folder, when data is moved on the display so as to turn around the side (thick line) decided that the cursor will pass at step S25.

It returns to step S23 after finishing the process of step S26.

By performing above-described data storing process by the PC 200a, the data is hard to be stored in a destination folder and the storing can be limited incases where the opening range set for the source folder and the opening range set for the destination folder differ.

Especially, when data is moved linearly toward the destination folder from the source folder, data is not made to be stored in the destination folder. Therefore, by making the simplest operation or an operation most likely performed for storing data ineffective, unconscious change of the opening range can be reliably avoided.

By this means, even when the opening range set for the destination folder is wider than the opening range set for the source folder, for example, it is possible to avoid to unconsciously open the data to a partner to whom the data is not intended to open. In other words, limiting storing notifies the user of a fact that the user will expand the opening range.

When the opening range set for the destination folder is narrower than the opening range set for the source folder, it is possible to avoid to unconsciously make data non-public, the date being needed to be disclosed. In other words, it notifies the user of a fact that the user will reduce the opening range.

Since the movement of a cursor (for example, mouse pointer) is not limited, change of the opening range which is not intended can be limited without interrupting a user's operation.

Note that a unit of division of the flowchart into each process described above is according to the main contents of the process, for the sake of facilitating an understanding of the printing system 1. The present invention is not limited by the manner of a classification of the process steps, and those names. The processes performed by the PC 200a can be divided into much more process steps. Moreover, one process step may perform much more processes.

The above-described second embodiment intends to exemplify the gist of the present invention, and does not limit the present invention. It is clear for a person skilled in the art that many substitutes, corrections, and modifications can be made.

For example, the shape of the target region 63 may be a shape other than rectangle (for example, a circle, an ellipse, or the like).

Figure 14A:
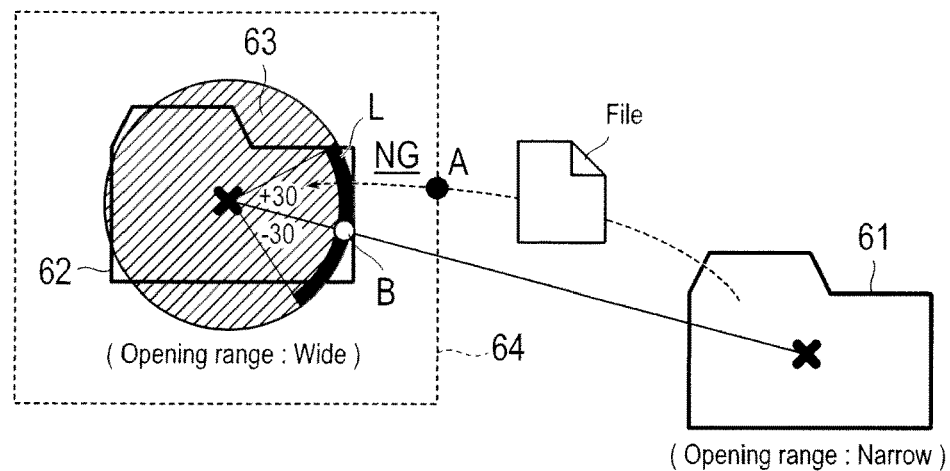
FIG. 14A is a drawing illustrating a first modification of the target region according to the second embodiment.
Figure 14B:
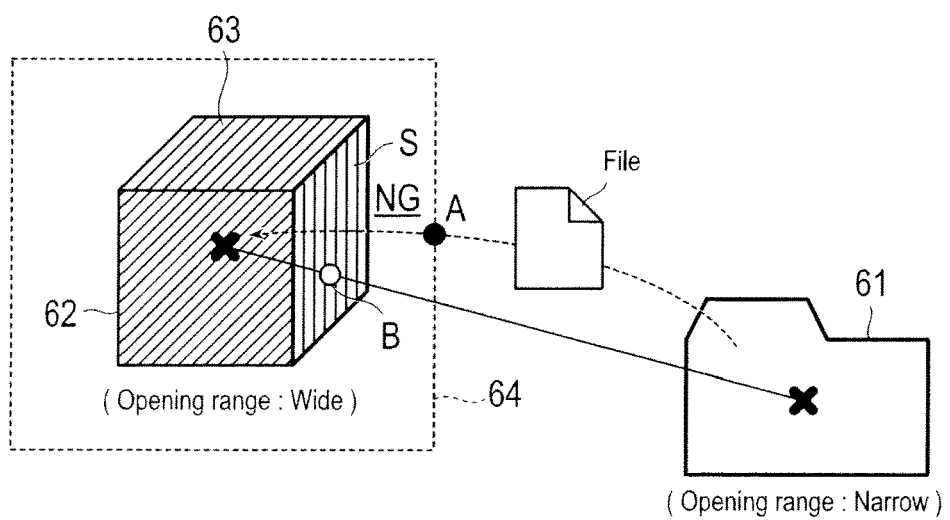
FIG. 14B is a drawing illustrating a second modification of the target region according to the second embodiment.

FIGS. 14A and 14B are drawings illustrating various modifications of the target region 63. FIG. 14A is a drawing illustrating a first modification in cases where the target region 63 is made a circle shape. In cases where the shape of the target region 63 is a circle, as illustrated in FIG. 14A, the control unit 201 decides, at the above-described step S25, an arc (arc with central angle of 60 degrees) L which intersects with the line connecting the destination folder and the source folder as the outer edge part through which a cursor will pass.

In this manner, if the shape of the target region 63 is a circle, storing data into the destination folder can be avoided in cases where data is linearly moved toward the destination folder from the source folder on the display.

FIG. 14B is a drawing illustrating a second modification in cases where the target region 63 is expressed as a shape like a cube. Actually, since the display is a plane, the target region 63 is expressed in three dimensions by a shape in which three parallelograms are combined. As illustrated in FIG. 14B, if the shape of the target region 63 is made a cube, the control unit 201 decides, at the above-described step S25, the one parallelogram (pinstriped region) S which intersects with the line connecting the destination folder and the source folder as the outer edge part through which a cursor will pass. In this manner, if the shape of the target region 63 is made a cube, storing data into the destination folder can be avoided in cases where data is linearly moved toward the destination folder from the source folder on the display.

Also in the second embodiment, the control unit 201 may expressly display the target region 63 on the display unit 203, and may display the target region 63 with a color (for example, red) for emphasizing.

The detection region 64 may also have any shape as long as the size of the detection region is at least equal to or more than the size of the target region 63.

In the above-described second embodiment, the storing of the data to the destination folder is not permitted when a cursor passes through the one side which forms the outer edge of the rectangular target region 63. However, it is not limited to this manner, and the storing of the data to the destination folder is not permitted when the cursor passes through a part (for example, center part) of the one side which forms the outer edge of the target region 63. Moreover, the storing of the data is not permitted when the cursor passes through any side of a plurality of sides (two sides, three sides) which form the outer edge of the target region 63.

The above-described first embodiment and second embodiment are described on a premise that the order of the width of opening range 340 included in the opening range data 300 is determined in advance. However, the present invention is not limited to this manner, and the order of the width of opening range 340 can be arbitrarily changed by a user.

Figure 15:
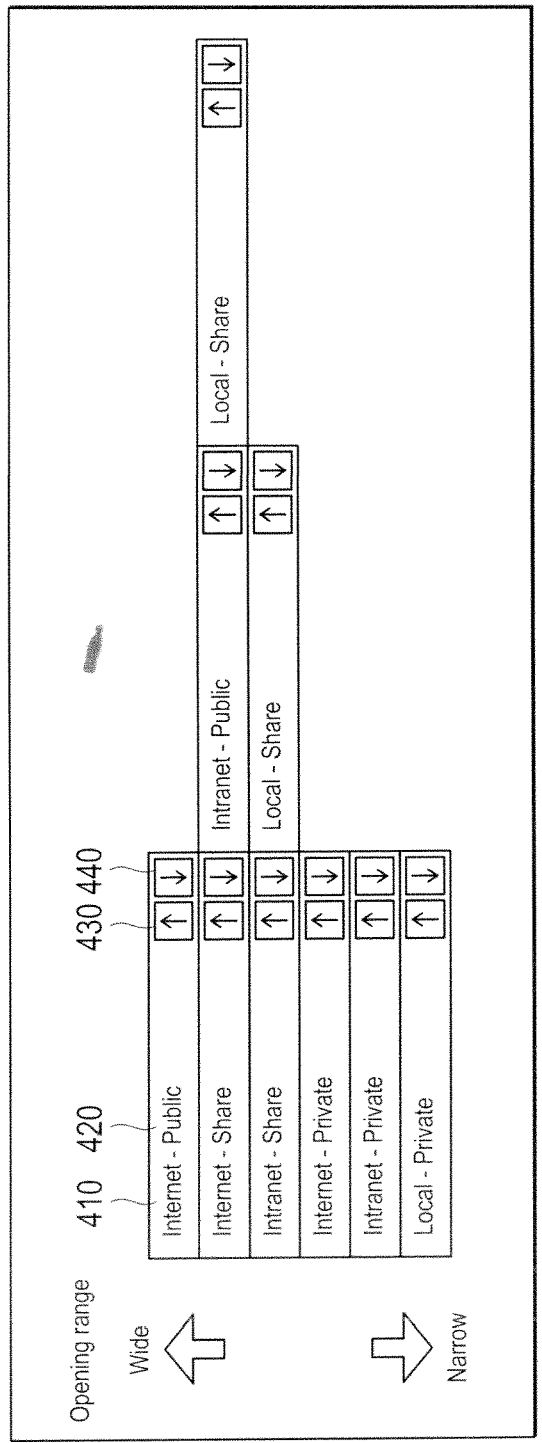
FIG. 15 is a drawing illustrating an example of a change screen for changing the opening range data.

FIG. 15 is a drawing illustrating a change screen 400 for changing the order of the width of opening range 340. As illustrated in FIG. 15, the control unit 201 displays the change screen 400 on the display unit 203. In the change screen 400, regions 410 and 420 are provided, indicating the network on which data is opened 320 and the access authority 330, respectively, which are included in the opening range data 300. By operating an up button 430 and a down button 440, the order of the width of opening range 340 can be changed freely about the first to ninth opening ranges 310 provided for combinations of the network on which data is opened 320 and the access authority 330.

The above-described first embodiment and second embodiment describe the example which stores data in the destination folder by drag and drop. However, the present invention is not limited to this manner, and it is only necessary to input instructions to copy data (or, cut data), and instructions to paste the data in the destination folder. Note that, in this case, it is determined that the preliminary operation for storing data in the destination folder is made, when a cursor (for example, mouse pointer) enters into the detection region 64.

As an embodiment of the present invention, a case is described above in which the folder is decompressed and displayed as a folder window. However, especially for the destination folder, it may use different controls between a case where the folder icon is displayed without being decompressed, and a case where the folder is decompressed and displayed as a folder window. Specifically, in cases where the folder icon is displayed, a control of limiting file movement may be performed in accordance with the above-described first and second embodiment when the preliminary operation is detected. Moreover, in cases where the folder is displayed as a folder window, an alarm may be displayed regarding the file movement when the preliminary operation is detected.

The description of the constitution of the printing system 1 described above is made for describing major components with describing the features of above-described embodiments, but it is not limited to the above-described constitution. Moreover, the components included in ordinary data management server 100 and client apparatus 200 (PC 200*a*, mobile terminal 200*b* and image forming apparatus 200*c*) are not excluded.

Note that each functional component of the above-described printing system 1 is classified according to the main contents of a process, for the sake of facilitating an understanding of each functional component. The present invention is not limited by the classification manner of the components, and those names. Each functional component can also be classified into much more components according to the contents of a process. Moreover, it can be classified so that one component may perform much more processes.

The programs which operate the data management server 100 and the client apparatus 200 may be provided by a computer readable recording medium such as a USB memory, a floppy (registered trademark in Japan) disk, CD-ROM, or may be provided on-line through a network such as the Internet. In this case, the programs recorded on the computer readable recording medium is usually transferred to the ROM, the HDD or the like to be stored. Moreover, the programs may be provided as independent application software, for example, and may be included in the software of the data management server 100 and the client apparatus 200 as a function of the apparatuses.

The processes of respective components described above are also realizable by a dedicated hardware circuit. In this case, the processes may be performed by single hardware, and may be performed by a plurality of hardware components.

According to the above-described embodiments and modifications, when data is moved to the destination folder from the source folder, the storing of the data to the destination folder is limited in cases where the opening range (the access permission range) set for the source folder and the opening range set for the destination folder differ. This does not provide a limitation in operation of moving data. Therefore, it is possible to limit the storing of data in the destination folder contrary to a user's intention without interrupting a user's operation.

What is claimed is:

1. A non-transitory computer readable recording medium storing a data management program which causes a data management apparatus to perform management of data stored in each folder to which an access permission range is set, the data management program causing the data management apparatus to perform steps of:
(a) setting a detection region for detecting a preliminary operation of a moving operation for a cursor on a display, the moving operation being for storing any data into a destination folder which can store data; and
(b) limiting a storing of the data into the destination folder in cases where the preliminary operation is detected at the set detection region, and the access permission range set for the destination folder is different from the access permission range set for a source folder storing the data originally,
wherein in the step (b), when limiting the storing of the data, a target region designated for storing the data is changed from a reference state, at which storing of the data at the destination folder is accepted, to a second state having a first boundary which, when intersected by a continuous movement path of the cursor starting from the source folder and then proceeding toward the destination folder, always prevents storing of the data into the destination folder, and a second boundary which, when intersected by a continuous movement path of the cursor starting from the source folder and then proceeding directly to and ending at the destination folder, always allows storing of the data into the destination folder, wherein the first boundary and the second boundary form an outer edge of the target region.

2. The non-transitory computer readable recording medium as claimed in claim 1, wherein
in the step (b), when the target region is changed from the reference state, at least one of size, shape, position and color of the target region is changed.

3. The non-transitory computer readable recording medium as claimed in claim 1, wherein
in the step (b), when the preliminary operation indicates passing a predetermined part of the target region which intersects with a straight line connecting the source folder and the destination folder, the storing of the data into the destination folder is not permitted.

4. The non-transitory computer readable recording medium as claimed in claim 3, wherein the predetermined part of the target region is the first boundary.

5. A data management apparatus comprising:
a processor executing a program causing the processor to function as
a permission range setting unit that sets an access permission range for a destination folder which can store data;
a detection region setting unit that sets a detection region for detecting a preliminary operation of a moving operation for a cursor on a display, the moving operation being for storing any data into the destination folder; and
a storing limitation unit that limits storing of the data into the destination folder in cases where the preliminary operation is detected at the set detection region which is set, and the access permission range set for the destination folder is different from the access permission range set for a source folder storing the data originally,
wherein the processor, when functioning as the storing limitation unit, changes a target region designated for storing the data from a reference state, at which storing of the data at the destination folder is accepted, to a second state having a first boundary which, when intersected by a continuous movement path of the cursor starting from the source folder and then proceeding toward the destination folder, always prevents storing of the data into the destination folder, and a second boundary which, when intersected by a continuous movement path of the cursor starting from the source folder and then proceeding directly to and ending at the destination folder, always allows storing of the data into the destination folder, wherein the first boundary and the second boundary form an outer edge of the target region.

6. The data management apparatus as claimed in claim 5, wherein
the processor, when functioning as the storing limitation unit, changes at least one of size, shape, position and color of the target region when the target region is changed from the reference state.

7. The data management apparatus as claimed in claim 5, wherein
the processor, when functioning as the storing limitation unit, does not permit the storing of the data into the destination folder when the preliminary operation indicates passing a predetermined part of the target region which intersects with a straight line connecting the source folder and the destination folder.

8. The data management apparatus as claimed in claim 7, wherein the predetermined part of the target region is the first boundary.

9. A data management system in which a data management server and a data management apparatus are connected through a network so as to communicate with each other, wherein
the data management server comprises a memory unit including a storage medium in which data is stored,
the data management apparatus comprises:
a processor executing a program causing the processor to function as
a permission range setting unit that sets an access permission range for each destination folder in the memory unit, which can store data;
a detection region setting unit that sets a detection region for detecting a preliminary operation of a moving operation for a cursor on a display, the moving operation being for storing any data into the destination folder; and
a storing limitation unit that limits storing of the data into the destination folder in cases where the preliminary operation is detected at the set detection region which is set, and the access permission range set for the destination folder is different from the access permission range set for a source folder storing the data originally,
wherein the processor, when functioning as the storing limitation unit, changes a target region designated for storing the data from a reference state, at which storing of the data at the destination folder is accepted, to a second state having a first boundary which, when intersected by a continuous movement path of the cursor starting from the source folder and then proceeding toward the destination folder, always prevents storing of the data into the destination folder, and a second boundary which, when intersected by a continuous movement path of the cursor starting from the source folder and then proceeding directly to and ending at the destination folder, always allows storing of the data into the destination folder, wherein the first boundary and the second boundary forming an outer edge of the target region.

10. The data management system as claimed in claim 9, wherein the processor, when functioning as the storing limitation unit, changes at least one of size, shape, position and color of the target region when the target region is changed from the reference state.

11. The data management system as claimed in claim 9, wherein the processor, when functioning as the storing limitation unit, does not permit the storing of the data into the destination folder when the preliminary operation indicates passing a predetermined part of the target region which intersects with a straight line connecting the source folder and the destination folder.

12. The data management system as claimed in claim 11, wherein the predetermined part of the target region is the first boundary.

* * * * *